United States Patent [19]

Nishida et al.

[11] Patent Number: 5,013,774

[45] Date of Patent: May 7, 1991

[54] THERMOPLASTIC METHACRYLIMIDE GROUP-CONTAINING RESIN COMPOSITION

[75] Inventors: Kozi Nishida; Mikiharu Watanabe, all of Toyama, Japan

[73] Assignee: Mitsubishi Rayon Company, Ltd., Tokyo, Japan

[21] Appl. No.: 319,710

[22] Filed: Mar. 7, 1989

[30] Foreign Application Priority Data

Mar. 8, 1988 [JP] Japan .................................. 63-54035

[51] Int. Cl.⁵ ............................................ C08K 5/34
[52] U.S. Cl. ..................... 524/91; 524/560; 525/329.5; 525/330.5; 525/374; 525/375; 525/379
[58] Field of Search ................. 525/330.5, 329.9, 379, 525/375, 374; 524/91, 560

[56] References Cited

U.S. PATENT DOCUMENTS

| | | | |
|---|---|---|---|
| 4,153,596 | 5/1979 | Oertel et al. | 525/375 |
| 4,246,374 | 1/1981 | Kopchik | 525/330.5 |
| 4,745,159 | 5/1988 | Anzai et al. | 525/329.9 |
| 4,751,281 | 6/1988 | Cantatore et al. | 525/374 |

FOREIGN PATENT DOCUMENTS 0156210 10/1985 European Pat. Off. .

Primary Examiner—Lewis T. Jacobs
Assistant Examiner—Thomas McDonald, Jr.
Attorney, Agent, or Firm—Oblon, Spivak, McClelland, Maier & Neustadt

[57] ABSTRACT

A thermoplastic methacrylimide group-containing resin composition comprised of (a) a methacrylimide group-containing polymer comprising 5 to 100% by weight of units of an imide ring structure represented by the following structural formula (I):

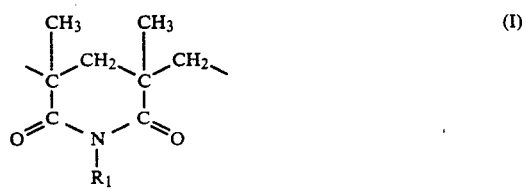

wherein $R_1$ stands for a hydrogen atom, a substituted or unsubstituted alkyl, cycloalkyl, aryl, alkaryl, aralkyl or allyl group having 1 to 20 carbon atoms, and 0 to 95% by weight of units derived from at least one monoethylenically unsaturated monomer, and (b) a small amount of a tetramethylpiperidine derivative is described. A shaped article made from this composition has a highly improved weatherability.

7 Claims, No Drawings

THERMOPLASTIC METHACRYLIMIDE GROUP-CONTAINING RESIN COMPOSITION

BACKGROUND OF THE INVENTION (1) Field of the Invention

The present invention relates to a thermoplastic resin composition having excellent heat resistance, transparency and light resistance. More particularly, the present invention relates to a thermoplastic methacrylimide group-containing resin composition having improved weatherability.

(2) Description of the Related Art

It is known that a methacrylimide group-containing polymer is a thermoplastic resin having a high heat distortion temperature and a high transparency (see Japanese Examined Patent Publication No. 60-38404).

However, the methacrylimide group-containing polymer has a poor resistance to sunbeams, wind and rain, and heat and cold. Namely, the weatherability of the methacrylimide group-containing polymer is not satisfactory, and reduction of the transparency and degradation of the appearance are often caused. Accordingly, the poor weatherability is a very important problem in practical use of this polymer.

Attempts have been made to improve the weatherability of the methacrylimide group-containing polymer by incorporating various ultraviolet absorbers such as benzophenone type ultraviolet absorbers and benzotriazole type ultraviolet absorbers. However, even if such an ultraviolet absorber is used, a methacrylimide group-containing polymer comparable to a methyl methacrylate resin, which is a transparent resin having a highest weatherability, cannot be obtained.

SUMMARY OF THE INVENTION

Under this background, it is a primary object of the present invention to provide a methacrylimide group-containing resin composition having an improved weatherability.

More specifically, in accordance with the present invention, there is provided a thermoplastic methacrylimide group-containing resin composition which comprises parts by weight of a methacrylimide group-containing polymer comprising 5 to 100% by weight of units of an imide ring structure represented by the following structural formula (I):

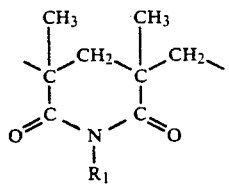

(I)

wherein $R_1$ stands for a hydrogen atom, a substituted or unsubstituted alkyl, cycloalkyl, aryl, alkaryl, aralkyl or allyl group having 1 to 20 carbon atoms, and 0 to 95% by weight of units derived from at least one monoethylenically unsaturated monomer, and 0.01 to parts by weight of a tetramethylpiperidine derivative.

DESCRIPTION OF THE PREFERRED EMBODIMENTS

The methacrylimide group-containing polymer used in the present invention is preferably prepared in the following manner. Namely, a methacrylic polymer is reacted with ammonia or a primary amine having 1 to 20 carbon atoms (ammonia or this primary amine will be called "an imidizing agent" hereinafter) at 180° to 350° C., preferably 200° to 330° C., in an inert solvent in an inert gas atmosphere. Nitrogen gas is advantageous as the inert gas. An inert solvent or mixed solvent thereof which is capable of dissolving the starting methacrylic polymer and the produced methacrylimide group-containing polymer is preferably used as the inert solvent. For example, there can be mentioned aromatic hydrocarbons such as benzene, toluene and xylene, and aliphatic alcohols such as methanol, ethanol and propanol.

In the above-mentioned imide ring structural units, $R_1$ stands for a hydrogen atom, a substituted or unsubstituted alkyl, cycloalkyl, aryl, alkaryl, aralkyl or allyl group having 1 to 20 carbon atoms. A hydrogen atom, a methyl group, an ethyl group, a t-butyl group, a cyclohexyl group, and a phenyl group are preferred as $R_1$. As the imidizing agent for obtaining the above-mentioned imide ring structural units, ammonia, methylamine, ethylamine, t-butylamine and cyclohexylamine are preferably used.

The methacrylimide group-containing polymer used in the present invention comprises at least 5% by weight, preferably at least 20% by weight, of the imide ring structural units. If the content of the imide ring structural units is lower than 5% by weight, the heat resistance temperature of the polymer is low, and the effect of the present invention is not sufficiently exerted.

As the methacrylic polymer used for the production of the methacrylimide group-containing polymer in the present invention, there can be mentioned a homopolymer of methyl methacrylate or other methacrylic acid ester, a copolymer of a plurality of methacrylic acid esters, and a copolymer of a methacrylic acid ester and other monoethylenically unsaturated monomer.

As the monoethylenically unsaturated monomer to be copolymerized, there can be mentioned acrylic acid esters such as methyl acrylate, ethyl acrylate, propyl acrylate, n-butyl acrylate, isobutyl acrylate, t-butyl acrylate, cyclohexyl acrylate and benzyl acrylate, styrene type monomers such as styrene and α-methylstyrene, and acrylonitrile. As the methacrylic acid ester, there can be mentioned, for example, methyl methacrylate, ethyl methacrylate, propyl methacrylate, n-butyl methacrylate, isobutyl methacrylate, t-butyl methacrylate, cyclohexyl methacrylate and benzyl methacrylate.

As the methacrylic polymer used for the production of the methacrylimide group-containing polymer, a homopolymer of methyl methacrylate, a methyl methacrylate/methyl acrylate copolymer and a methyl methacrylate/styrene copolymer are especially preferred. In these copolymers, the content of methyl methacrylate is not particularly critical, but preferably the content of methyl methacrylate is at least 70% by weight.

As the tetramethylpiperidine derivative used in the present invention, there can be mentioned derivatives having at least one unit represented by the following structural formula (II) or (III):

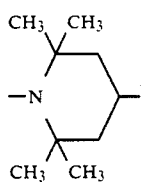

(II)

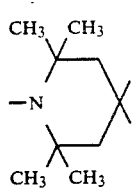
(III)

As specific examples, there can be mentioned 4-benzoyloxy-2,2,6,6-tetramethylpiperidine, 4-benzoyloxy-1,2,2,6,6-pentamethylpiperidine, 4-(p-t-butylbenzoyloxy)-2,2,6,6-tetramethylpiperidine, 4-(p-t-butylbenzoyloxy)-1,2,2,6,6-pentamethylpiperidine, 4-salicyloyloxy-1,2,2,6,6-pentamethylpiperidine, 4-acetoxy-2,2,6,6-tetramethylpiperidine, 4-butyroyloxy-2,2,6,6-tetramethylpiperidine, 4-stearoyloxy-2,2,6,6-tetramethylpiperidine, 4-cyclohexanoyl-2,2,6,6-tetramethylpiperidine, bis(2,2,6,6-tetramethyl-4-piperidyl)adipate, bis(2,2,6,6-tetramethyl-4-piperidyl)sebacate, bis(1,2,2,6,6-pentamethyl-4-piperidyl)sebacate, bis(2,2,6,6-tetramethyl-4-piperidyl)dodecanedioate, bis(1,2,2,6,6-pentamethyl-4-piperidyl)terephthalate, 1-{2-[3-(3,5-di-t-butyl-4-hydroxyphenyl)propionyloxy]ethyl}-4-[3-(3,5-di-t-butyl-4-hydroxyphenyl)propionyloxy]-2,2,6,6-tetramethylpiperidine, 8-benzyl-7,7,9,9-tetramethyl-3-octyl-1,3,8-triazaspiro[4,5]-undecan-2,4-dione, 7,7,8,9,9-pentamethyl-3-octyl-1,3,8,triazaspiro[4,5]undecan-2,4-dione, 7,7,8,9-tetramethyl-3-octyl-1,3,8-triazaspiro[4,5]undecan-2,4-dione, poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}], bis(1,2,2,6,6-pentamethyl-4-piperidyl), 2-(3,5-di-tertbutyl-4-hydroxybenzyl)-2-n-butylmalonate, dimethyl succinate/1-(2-hydroxyethyl)-4-hydroxy-2,2,6,6-tetramethylpiperidine condensate, N,N'-bis(3-aminopropyl)ethylenediamine/2,4-bis[N-butyl-N-(1,2,2,6,6-pentamethyl-4-piperidyl)amino]-6-chloro-1,3,5-triazine condensate, 1,2,3,4-butanetetracarboxylic acid/4-hydroxy-2,2,6,6-tetramethylpiperidine condensate, and 1,2,3,4-butanetetracarboxylic acid/4-hydroxy-1,2,2,6,6-pentamethylpiperidine condensate.

The amount of the tetramethylpiperidine derivative incorporated is 0.01 to 10 parts by weight, preferably 0.05 to 3 parts by weight, per 100 parts by weight of the methacrylimide group-containing polymer. If the amount of the tetramethylpiperidine derivative is smaller than 0.01 part by weight, the effect of improving the weatherability is not satisfactory, and if the amount of the tetramethylpiperidine derivative is larger than 10 parts by weight, the mechanical strength of the methacrylimide group-containing polymer is degraded.

As the means for adding the tetramethylpiperidine derivative used in the present invention, there can be adopted a method in which the tetramethylpiperidine derivative is added to the methacrylimide group-containing polymer by using an extruder, a method in which the tetramethylpiperidine derivative is added at the time of the reaction for producing the imide ring structure represented by the above-mentioned formula (I), a method in which the tetramethylpiperidine derivative is added at the time of the preparation of the methacrylic polymer as the starting material, of the methacrylimide group-containing polymer, especially at the time of the polymerization, and a method in which the tetramethylpiperidine derivative is added after the polymerization. The method in which the tetramethylpiperidine derivative is added to the methacrylimide group-containing polymer by using an extruder is substantially simple, and the operation can be easily accomplished according to this method.

Other ultraviolet absorbers, for example, triazole type ultraviolet absorbers, benzophenone type ultraviolet absorbers and salicylic acid type absorbers, and heat stabilizers, for example, hindered phenol type heat stabilizers and phosphite type heat stabilizers, may be used in combination with the tetramethylpiperidine derivative for the resin composition of the present invention. Use of a triazole type ultraviolet absorber is especially preferred, and as preferred examples, there can be mentioned 2-(2H-benzotriazole-2-yl)-4-(1,1,3,3,-tetramethylbutyl)phenol and 2-(3,5-di-t-butyl-2-hydroxyphenyl)benzotriazole. This ultraviolet absorber is incorporated in an amount of 0.01 to 5.0 parts by weight based on 100 parts by weight of the methacrylimide group-containing polymer.

Furthermore, a lubricant, a plasticizer, a colorant, a flame retardant, a foaming agent, a pigment, a delusterant, an antistatic agent, a glass fiber or other fibers, talc and other additives can be added to the resin composition of the present invention according to need.

Furthermore, other thermoplastic resin can be added to the resin composition of the present invention. For example, there can be mentioned a methyl methacrylate polymer, an ABS resin, an MBS resin, an AS resin, a polycarbonate, polybutylene terephthalate, polyethylene terephthalate, polyvinyl chloride, chlorinated polyvinyl chloride, a polyarylate, polystyrene, high-impact polystyrene, a styrene/maleic anhydride copolymer, a styrene/maleimide copolymer, a polyolefin, an acid-modified polyolefin, a glycidyl-modified polyolefin, a polyether ester, a polyether ester amide, a polyether amide, polyphenylene sulfide, polyphenylene oxide, a polysulfone, a polyphenylene oxide/styrene type resin blend, a polyether ether-ketone, a polyether imide and a thermoplastic polyimide. These resins can be used alone or in the form of a mixture of two or more thereof.

The present invention will now be described in detail with reference to the following examples.

Note, in the examples and comparative examples, all of "parts" are by weight.

In these examples, the characteristics of polymers were determined according to the following methods.

(1) The infrared absorption spectrum was determined according to the KBr disk method by using an infrared spectrophotometer (Model 285 supplied by Hitachi).

(2) The inherent viscosity of the polymer was determined by measuring the flow time (ts) of a chloroform solution containing 0.5% by weight of the sample polymer and the flow time (to) of chloroform at a temperature of 25° C. ±0.1° C. by a Deereax-Bishoff viscometer, calculating the relative viscosity $\eta$rel of the polymer from the ts/to value, and calculating the inherent viscosity according to the following formula:

inherent viscosity=$(\ln \eta \mathrm{rel})/C(\mathrm{dl/g})$ wherein C stands for the gram number of the polymer per 100 ml of the solvent.

(3) The heat distortion temperature was measured according to ASTM D-648.

(4) The melt index of the polymer was determined according to ASTM D-1238 (the gram number of the polymer under a load of 10 kg at 260° C. for 10 minutes).

(5) The imidization amount (%) of the polymer was determined from the nitrogen content obtained at the elementary analysis (measured by CHN Coder MT-3 supplied by Yanagimoto Seisakusho) and the proton NMR measurement result obtained at 100 MHz by a spectrometer (JNM-FX-100 supplied by JEOL).

(6) The transparency was evaluated based on the total luminous transmittance determined according to ASTM D-1003 with respect to a plate having a thickness of 3.2 mm, which was formed from the sample resin composition.

(7) The weatherability was evaluated based on the results of the accelerated exposure test conducted by using Sunshine Carbon Weather Meter WEL-SUN-HC supplied by Suga Shikenki (18 minutes' spraying among 120 minutes' exposure; black panel temperature =63° C.). Note, at the evaluation of the weatherability, in addition to the determination of the transparency, the naked eye observation of the appearance and the microscope observation were carried out.

(8) The tensile strength was measured by using dumbbell specimens according to JIS K-6871.

Preparation of Methacrylimide Group-Containing Polymers (A-1 through A-4)

A 10-liter reaction vessel equipped with a paddle spiral agitator, a pressure gauge, a sample-injecting device and a jacket heater was charged with a mixture of 100 parts of a sufficiently dried methyl methacrylate polymer (Acrypet® VH supplied by Mitsubishi Rayon; intrinsic viscosity =0.51), 90 parts of toluene and 10 parts of methanol, and the inner atmosphere was sufficiently replaced by nitrogen. Then, the mixture was heated and the polymer was dissolved with stirring. Then, a methanol solution of 24.8 parts (molar ratio of 0.8) of methylamine was introduced from the sample-injecting device, and the mixture was heated at 230° C. and stirred. Reaction was carried out under an inner pressure of 55 kg/cm$^2$ (gauge) for 3 hours. After termination of the reaction, the methacrylimide group-containing polymer solution was taken out and the solvent was removed at 100° C. by a vacuum drier and the solid was dried to obtain a porous polymer. When the infrared absorption spectrum of the obtained polymer was measured, characteristic absorptions of methacrylimide were observed at wave numbers of 1720 cm$^{-1}$, 1663 cm$^{-1}$ and 750 cm$^{-1}$. Accordingly, it was confirmed that the polymer was a polyglutarimide. The imidization ratio was 100% and the heat distortion temperature was 182° C. Methacrylimide group-containing polymers having different heat distortion temperatures were prepared in the same manner while changing the imidization ratio. The results are shown in Table 1. The melt index of each of the obtained polymers having different imidization ratios was measured. The obtained values are shown in Table 1.

TABLE 1

| Methacrylimide Group-Containing Polymer | | | |
|---|---|---|---|
| Polymer | Imidization ratio (%) | Heat distortion temperature (°C.) | Melt index |
| A-1 | 100 | 182 | 3.5 |
| A-2 | 70 | 159 | 6.0 |
| A-3 | 50 | 150 | 13.2 |
| A-4 | 30 | 132 | 25.0 |

The imidization ratio referred to herein was determined in the following manner.

Namely, it was supposed that the polymer had methacrylimide ring structure units and methyl methacrylate units, as shown by the following general structural formula (IV):

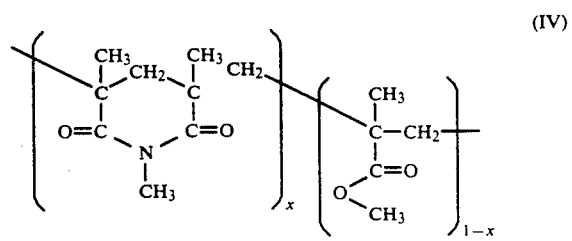

The value of x×100 (%) was defined as the imidization.

The value of x was determined from the nitrogen content obtained at the elementary analysis and from the integration ratio between the methyl absorption of N—CH$_3$ and the methyl absorption of (O—CH$_3$), obtained at the proton NMR measurement.

EXAMPLES 1 through 4

To 100 parts of the polymer A-1, A-2, A-3 or A-4 was added 0.2 part of 4-benzoyloxy-2,2,6,6-tetramethylpiperidine (Sanol LS744 supplied by Sankyo), and the composition was mixed for 5 minutes by a V-blender. The mixture was shaped into pellets by a vented extruder having a diameter of 40 mm at a cylinder temperature of 230° to 300° C. Thus, four kinds of thermoplastic resin compositions of the present invention were obtained. The pellets were molded into plates having a thickness of 3.2 mm, a length of 100 mm and a width of 100 mm and dumbbell specimens specified in JIS K-6871 by using a 5-ounce injection molding machine. These plates and dumbbell specimens were subjected to the accelerated exposure test for 1,000 hours, and the weatherability was evaluated.

In connection with the weatherability concerning the appearance of the molded plate, the total luminous transmittance of the plate was measured according to ASTM D-1003 before and after the exposure, and the change of the color was checked by the naked eye observation. In connection with the weatherability concerning the physical properties, the tensile strength of the dumbbell specimen was measured according to JIS K-6871 before and after the exposure. The results are collectively shown in Table 2.

COMPARATIVE EXAMPLES 1 THROUGH 4

Plates and dumbbell specimens were prepared from the methacrylimide group-containing polymers A-1 through A-4 in the same manner as described in Examples 1 through 4 except that the piperidine derivative was not used. These plates and dumbbell specimens were tested and evaluated in the same manner as described in Examples 1 through 4. The obtained results are shown in Table 2.

TABLE 2

| | Before exposure | | | After 1000 hours' exposure | | |
|---|---|---|---|---|---|---|
| | Total luminous transmittance (%) | Appearance | Tensile strength (kg/cm$^2$) | Total luminous transmittance (%) | Appearance | Tensile strength (kg/cm$^2$) |
| Example 1 | 91 | Good surface | 850 | 77 | Good surface | 840 |
| Example 2 | 91 | Good surface | 830 | 80 | Good surface | 820 |
| Example 3 | 91 | Good surface | 800 | 80 | Good surface | 790 |
| Example 4 | 91 | Good surface | 770 | 83 | Good surface | 760 |
| Comparative Example 1 | 91 | Good surface | 850 | 35 | Whitening and cracking occurred | 650 |
| Comparative Example 2 | 91 | Good surface | 830 | 42 | Whitening and cracking occurred | 630 |
| Comparative Example 3 | 91 | Good surface | 800 | 45 | Whitening and cracking occurred | 630 |
| Comparative Example 4 | 91 | Good surface | 770 | 47 | Whitening and cracking occurred | 630 |

EXAMPLE 5

To 100 parts of the methacrylimide group-containing polymer A-b 2 were added 0.2 part of butyl palmitate (plasticizer), 0.1 part of 2-(5-methyl-2-hydroxyphenyl)-benzotriazole (ultraviolet absorber marketed under tradename of "Tinuvin P" by Ciba-Geigy), 0.2 part of octadecyl-3-(3,5-di-t-butyl-4-hydroxyphenyl)propionate (heat stabilizer marketed under tradename of "Irganox 1076" by Ciba-Geigy) and 0.05 part of tris(2,4-di-t-butylphenyl)phosphite (heat stabilizer marketed under tradename of "Irgaphos 168" by Ciba-Geigy), and then, 0.2 part of bis(2,2,6,6-tetramethyl-4-piperidyl)sebacate (piperidine derivative marketed under tradename of "Sanol LS-770" by Sankyo) was further added. Plates and dumbbell specimens were prepared from this composition in the same manner as described in Example 1, and the physical properties were measured and evaluated. The results are shown in Table 3.

EXAMPLE 6

Plates and dumbbell specimens were prepared in the same manner as described in Example 5 except that bis(1,2,2,6,6-pentamethyl-4-piperidyl)sebacate (Sanol LS-765 supplied by Sankyo) was used as the piperidine derivative, and the physical properties were measured and evaluated. The results are shown in Table 3.

EXAMPLE 7

Plates and dumbbell specimens were prepared in the same manner as described in Example 5 except that 1-{2-[3-(3,5-di-t-butyl-4-hydroxyphenyl)propionyloxy]ethyl}-4-[3-(3,5-di-t-butyl-4-hydroxyphenyl)-propionyloxy]-2,2,6,6-tetramethylpiperidine (Sanol LS-2626 supplied by Sankyo) was used as the piperidine derivative, and the physical properties were measured and evaluated. The results are shown in Table 3.

EXAMPLE 8

Plates and dumbbell specimens were prepared in the same manner as described in Example 5 except that 8-benzyl-7,7,9,9-tetramethyl-3-octyl-1,3,8-triazaspiro[4,5]undecan-2,4-dione (Sanol LS-1114) was used as the piperidine derivative, and the physical properties were measured and evaluated. The results are shown in Table 3.

EXAMPLE 9

Plates and dumbbell specimens were prepared in the same manner as described in Example 5 except that dimethyl succinate/1-(2-hydroxyethyl)-4-hydroxy-2,2,6,6-tetramethylpiperidine condensate (Sanol LS-622LD supplied by Ciba-Geigy) was used as the piperidine derivative, and the physical properties were measured and evaluated. The results are shown in Table 3.

EXAMPLE 10

Plates and dumbbell specimens were prepared in the same manner as described in Example 5 except that poly[{6-(1,1,3,3-tetramethylbutyl)imino-1,3,5-triazin-2,4-diyl}{(2,2,6,6-tetramethyl-4-piperidyl)imino}-hexamethylene {(2,2,6,6-tetramethyl-4-piperidyl)imino}] (Sanol LS-944LD-DF supplied by Ciba-Geigy) was used as the piperidine, and the physical properties were measured and evaluated. The results are shown in Table 3.

EXAMPLE 11

Plates and dumbbell specimens were prepared in the same manner as described in Example 5 except that bis(1,2,2,6,6-pentamethyl-4-piperidyl) 2-(3,5-di-t-butyl-4-hydroxybenzyl)-2-n-butylmalonate (Tinuvin 144 supplied by Ciba-Geigy) was used as the piperidine derivative, and the physical properties were measured and evaluated. The results are shown in Table 3.

EXAMPLE 12

Plates and dumbbell specimens were prepared in the same manner as described in Example 5 except that 1,2,3,4-butanetetracarboxylic acid/4-hydroxy-2,2,6,6- tetramethylpiperidine polycondensate (Mark LA-57 supplied by Adeca-Argus) was used as the piperidine derivative, and the physical properties were measured and evaluated. The results are shown in Table 3.

COMPARATIVE EXAMPLE 5

Plates and dumbbell specimens were prepared in the same manner as described in Example 9 except that Sanol LS-622LD was not used. The physical properties were measured and evaluated. The results are shown in Table 3.

specimens were prepared from the resin composition in the same manner as described in Example 1. The physical properties were measured and evaluated. The results are shown in Table 4.

For comparison, the above procedures were repeated in the same manner except that only the ultraviolet absorber was added to the polymer A-2. The results are shown in Table 4.

TABLE 4

| | Tetramethyl-piperidine derivative and its amount (part) | UV Absorber and its amount (part) | Before exposure | | | After 1000 hours' exposure | | |
|---|---|---|---|---|---|---|---|---|
| | | | Total luminous transmittance (%) | Appearance | Tensile strength (kg/cm$^2$) | Total luminous transmittance (%) | Appearance | Tensile strength (kg/cm$^2$) |
| Example 13 | (A) 0.2 | (E) 0.2 | 91 | Good surface | 830 | 86 | Good surface | 820 |
| Example 14 | (B) 0.2 | (E) 0.2 | 91 | Good surface | 830 | 85 | Good surface | 810 |
| Example 15 | (C) 0.2 | (E) 0.2 | 91 | Good surface | 830 | 85 | Good surface | 820 |
| Example 16 | (D) 0.2 | (E) 0.2 | 91 | Good surface | 830 | 86 | Good surface | 820 |
| Comparative Example 6 | — — | (E) 0.2 | 91 | Good surface | 830 | 55 | Slight whitening and cracking occurred | 630 |
| Example 17 | (A) 0.2 | (F) 0.2 | 91 | Good surface | 830 | 87 | Good surface | 820 |
| Example 18 | (B) 0.2 | (F) 0.2 | 91 | Good surface | 830 | 85 | Good surface | 820 |
| Example 19 | (C) 0.2 | (F) 0.2 | 91 | Good surface | 830 | 85 | Good surface | 800 |
| Example 20 | (D) 0.2 | (F) 0.2 | 91 | Good surface | 830 | 86 | Good surface | 810 |
| Comparative Example 7 | — — | (F) 0.2 | 91 | Good surface | 830 | 58 | Slight whitening and cracking occurred | 600 |

Note
(A): 4-benzoyloxy-2,2,6,6-tetramethylpiperidine (Sanol S-744)
(B): bis(2,2,6,6-tetramethyl-4-piperidyl)-sebacate (Sanol LS-770)
(C): bis(1,2,2,6,6-pentamethyl-4-piperidyl)-sebacate (Sanol LS-765)
(D): 8-benzyl-7,7,9,9-tetramethyl-3-octyl-1,3,8-triazaspiro[4.5]undecan-2,4-dione (Sanol LS-1114)
(E): 2-(3,5-di-t-butyl-2-hydroxyphenyl)-benzotriazole (Tinuvin 320)
(F): 2-(2H-benzotriazole-2-yl)-4-(1,1,3,3-tetramethylbutyl)phenol (UV 5411)

TABLE 3

| | Before exposure | | | After 1000 hours' exposure | | |
|---|---|---|---|---|---|---|
| | Total luminous transmittance (%) | Appearance | Tensile strength (kg/cm$^2$) | Total luminous transmittance (%) | Appearance | Tensile strength (kg/cm$^2$) |
| Example 5 | 91 | Good surface | 830 | 83 | Good surface | 825 |
| Example 6 | 91 | Good surface | 830 | 79 | Good surface | 820 |
| Example 7 | 91 | Good surface | 830 | 82 | Good surface | 820 |
| Example 8 | 91 | Good surface | 830 | 81 | Good surface | 820 |
| Example 9 | 91 | Good surface | 830 | 83 | Good surface | 825 |
| Example 10 | 91 | Good surface | 830 | 75 | Good surface | 800 |
| Example 11 | 91 | Good surface | 830 | 77 | Good surface | 820 |
| Example 12 | 91 | Good surface | 830 | 79 | Good surface | 820 |
| Comparative Example 5 | 91 | Good surface | 830 | 44 | Whitening and cracking occurred | 640 |

EXAMPLES 13 THROUGH 20 AND COMPARATIVE EXAMPLES 6 AND 7

To 100 parts of the methacrylimide group-containing polymer A-2 were added 0.2 part of an ultraviolet absorber shown in Table 4 and 0.2 part of a piperidine derivative shown in Table 4, and plates and dumbbell

We claim:
1. A thermoplastic methacrylimide group-containing resin composition which comprises 100 parts by weight of a methacrylimide group-containing polymer comprising 5 to 100% by weight of units of an imide ring structure represented by the following structural formula (I):

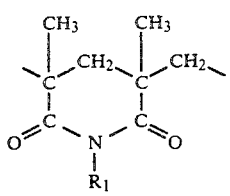

wherein $R_1$ stands for a hydrogen atom, a substituted or unsubstituted alkyl, cycloalkyl, aryl, alkaryl, aralkyl or allyl group having 1 to 20 atoms, and 0 to 95% by weight of units derived from at least one monoethylenically unsaturated monomer, 0.01 to 10 parts by weight of a tetramethylpiperidine derivative, and 0.01 to 5.0 parts by weight, based on 100 parts by weight of the methacrylimide group-containing polymer, of a triazole type ultraviolet absorber selected from the group consisting 2(2H-benzotriazole-2-yl)-4-(1,1,3,3-tetramethylbutyl)phenol and 2-(3,5-di-t-butyl-2-hydroxyphenyl)benzotriazole.

2. A thermoplastic resin composition as set forth in claim 1, wherein the tetramethylpiperidine derivative has at least one unit represented by the following structural formula (II) or (III):

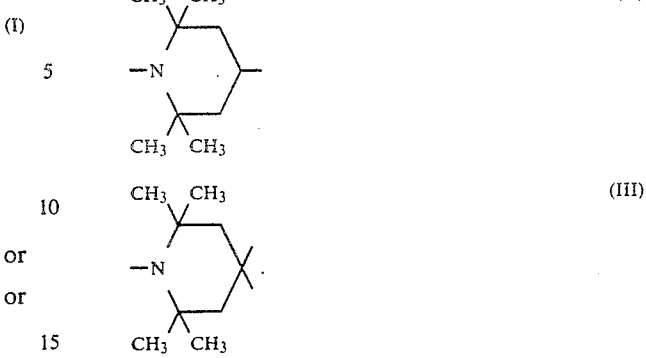

3. A thermoplastic resin composition as set forth in claim 1, wherein the tetramethylpiperidine derivative is 4-benzoyloxy-2,2,6,6-tetramethylpiperidine.

4. A thermoplastic resin composition as set forth in claim 1, wherein the tetramethylpiperidine derivative is bis(2,2,6,6-tetramethyl-4-piperidyl)sebacate.

5. A thermoplastic resin composition as set forth in claim 1, wherein the tetramethylpiperidine derivative is 1-{2-[3-(3,5-di-t-butyl-4-hydroxyphenyl)propionyloxy]ethyl}-4-[3-(3,5-di-t-butyl-4-hydroxyphenyl)-propionyloxy]-2,2,6,6-tetramethylpiperidine.

6. A thermoplastic resin composition as set forth in claim 1, wherein the tetramethylpiperidine derivative is 8-benzyl-7,7,9,9-tetramethyl-3-octyl-1,3,8-tri-azaspiro[4,5]undecan-2,4-dione.

7. A thermoplastic resin composition as set forth in claim 1, wherein the tetramethylpiperidine derivative is a condensate of dimethyl succinate with 1-(2-hydroxyethyl)-4-hydroxy-2,2,6,6-tetramethylpiperidine.

* * * * *